3,013,880
METHOD OF PELLETING HAY
William N. King, Los Gatos, Calif., assignor to FMC Corporation, a corporation of Delaware
No Drawing. Filed July 15, 1959, Ser. No. 827,168
5 Claims. (Cl. 99—8)

The present invention appertains to a method of pelleting hay or other similar plants at low pressures and with low expenditures of energy.

The formation of hay into pellets and the advantages of pelleted hay over baled hay as animal food are well known. It is desirable that the pellets have a density about 25 pounds per cubic foot, and that the pellets be held together with sufficient force to withstand normal handling without breakage. It is also desirable that these pellets be formed with as little expenditure of energy as possible.

Certain presently known practices in hay pelleting require the use of relatively dry hay having a moisture content of less than 14%. In this dry condition the hay is quite resilient and greatly resists the compressive forces required to compress the same into pellets. Also, this dry hay has so little moisture content that the hay fibers will not stick together, when known pelleting methods are employed, unless moisture is added during the pelleting process to moisten the starch globules which act as a binder, or unless tremendous pressures are used to crush the hay into pellets. Even when the dry hay is moistened during the pelleting process, the lowest known pressure which has been used to form pellets of satisfactory density and strength has been in the neighborhood of 3000 p.s.i. Without the addition of moisture to the hay, pelleting pressures as high as 22,000 p.s.i. have been required.

This dry hay has been preconditioned for pelleting by either chopping the hay into short pieces or by grinding the hay. Methods of pelleting hay, which include the step of chopping the hay, cannot be carried out at low pressures since the chopping process does not destroy the resilience of the hay nor does it liberate a sufficient amount of juices to bind the hay together at low pressure. Even if wet hay is used, the chopping process merely cuts the stems of the hay into tubular sections without effecting the normal resilience of the sections. Also, the chopping process is effective to liberate juices only at those surfaces where the hay is cut, and does not release any of the moisture contained within the cells of the chopped sections.

Similarly, methods of pelleting hay, which include the step of grinding the hay, cannot be performed at low pressures with either wet hay or dry hay. Wet hay cannot be effectively ground because of the liberation of glutenous juices which foul the grinding equipment. Dry hay can be ground satisfactorily and such grinding does destroy the resilience of the hay, however, not enough moisture is present to bind the ground material together at low pressure and no interlacing of fibers is possible since the fibrous nature of the material is destroyed.

It is apparent that machines capable of pelleting hay, when using the above known methods, must be quite heavy and cumbersome to withstand the tremendous pellet forming pressures required, and that a great deal of energy is required to operate these machines. These machines are therefore not suited for mobile operation in the field as a replacement for the hay baler but as a rule are mounted at fixed locations off the field and the hay is gathered from the field and hauled to these machines for pelleting. Because the hay is allowed to dry to a low moisture content before pelleting, and because leaves of dry hay are very easily lost during the additional step of gathering and transporting the hay to the pelleting machine, much of the nutrient content of the hay is lost.

It is, therefore, one object of the present invention to provide an improved method of pelleting hay which may be performed by a light weight, mobile apparatus drawn through the field and arranged to collect the hay directly from the field.

Another object is to provide a low pressure method of pelleting hay having a moisture content of from 14% to 35%.

Another object is to provide an improved method of preconditioning hay having a moisture content of between 14% to 35% prior to forming the same into pellets.

Another object is to provide an improved method of pelleting hay shortly after the hay has been cut to reduce nutrient losses common with the usual practices of pelleting hay and to reduce the time required for the hay to dry on the ground.

The method of the present invention is adapted to be performed by a light weight mobile pelleting machine arranged to be drawn through hay fields to gather the cut hay directly from the field. It is well known in the art that it is desirable to remove the hay from the field as soon as possible in order to prevent weather damage such as bleaching or the formation of mold after a rain, and in order to minimize excessive drying and the resulting physical loss of highly nutrient leaves during handling of the hay prior to the actual pellet forming operation.

In practicing the method of the present invention, hay having a moisture content between 14% to 35% is gathered from the field by the pelleting machine thereby making it possible to shorten the time required to dry the hay to pelleting condition by several days.

The hay is then masticated, and during the masticating operation, the hay is crushed, and torn, ruptured or cut into random lengths usually of about one-half inch or less. Occasionally a few longer lengths are present and these long lengths aid in providing an interlaced pellet structure. The mastication causes the breakdown of the natural fibrous structure of the stems resulting in the liberation of the glutenous juices in the stems and in the leaves which act as a binder when the masticated hay is pressed into pellets. Also during this step, the natural resilience of the stems is destroyed and the resulting product is in the form of an inelastic, damp mass of limp material which has very little tendency to expand after it has been formed into pellets.

This masticated material is then fed into dies and is compressed into pellets of any suitable shape and size. A press having a two inch diameter bore has been used successfully to form pellets of commercial size which are two inches in diameter and are between one-half and one inch in length. The pellets are formed by using pressure in the range of 200 to 1600 p.s.i. depending upon the moisture content of the masticated material and the desired density of finished pellet. It has been found that pellets formed by the method of the present invention and having a density of 25 pounds per cubic foot or higher will maintain their pellet shapes when subjected to normal handling techniques. Pellets having densities up to 45 pounds per cubic foot can be formed by pressures in the above range. If higher density pellets are desired, these pellets can be formed by pressure above 1600 p.s.i.

It should be mentioned that pellets having either a low or a high density can be formed by the method of the present invention at much lower pressures, and hence lower energy values than are required when forming pellets from chopped or ground hay. For example, when forming a pellet having a density of 30 pounds per cubic foot from masticated hay, only ⅙ as much pelleting energy is required as is required for making pellets from chopped hay. When a 40 pound per cubic foot pellet is formed, less than 1/10 the energy is expended for masticated hay as is expended when using chopped hay. It is believed that this energy saving is due to the removal of the natural resilience of the hay during the masticating step.

After the pellets have been released from the forming dies, they are transported to storage bins, or the like, and are allowed to dry in order to prevent the formation of mold. Under normal atmospheric conditions, no special drying techniques other than adequate ventilation are required.

The outer surfaces of the dried pellet have a somewhat glazed appearance and, when the pellet is broken to reveal the internal structure, it is noted that many hairlike fibers and flat stem pieces are interwoven to provide a relatively strong pellet even though its density is close to the lower end of the range of desirable densities. The color and odor of the pellets resemble the color and odor of the same type of hay when baled at rather high moisture contents.

The hay pelleting method of the pressure invention is operable with hay having a rather wide moisture content range (14% to 35%), and with a rather wide range of pellet compressing pressures (200 p.s.i. to 1600 p.s.i.). Thus, a field machine using the method of the present invention could begin pelleting hay when the moisture content of cut hay in the field reaches 35% and could continue to pellet the hay during the period when the hay gradually dries to a moisture content of 14%.

The following table covers the characteristics of twelve test pellets formed following the method of the present invention. These commercial size test pellets are 2″ in diameter and between ½″ to 1″ in length, and their expansion after release of pressure and during the drying period did not cause a change in length in excess of 1/16″.

| Pellet No. | Pelleting Pressure, p.s.i. | Moisture Content When Pelleted (Wet Basis), percent | Density of Dried Pellets, lbs./ft.³ |
| --- | --- | --- | --- |
| 1 | 200 | 20 | 28.2 |
| 2 | 400 | 20 | 31.0 |
| 3 | 800 | 20 | 40.6 |
| 4 | 1,000 | 20 | 45.6 |
| 5 | 200 | 29.6 | 32.8 |
| 6 | 400 | 29.6 | 35.6 |
| 7 | 800 | 29.6 | 41.3 |
| 8 | 1,680 | 29.6 | 37.5 |
| 9 | 200 | 34.2 | 24.8 |
| 10 | 400 | 34.2 | 24.4 |
| 11 | 800 | 34.2 | 26.0 |
| 12 | 1,680 | 34.2 | 29.4 |

The density of test pellets 1–4 was taken after a drying period of more than one week and the density of pellets 4–12 was taken after a drying period of more than one month. All of these pellets have a final moisture content of between 10% and 15%. The table indicates that hay having a moisture content between 20% and 35% can be made into pellets having a density of approximately 25 pounds per cubic foot with pressures as low as 200 p.s.i. and with correspondingly low energy requirements when the method of the present invention is employed.

For certain feeding conditions, pellets having a density slightly less than 25 pounds per cubic foot may be commercially acceptable. It has been found that such pellets can be formed according to the present invention by masticating hay having a moisture contents as high as 55% using pressures below 1600 p.s.i. For example, hay at a moisture content of 55% has been formed into pellets, having a density of 16.4 pounds per cubic foot when dry, by masticating the hay and compressing it at 800 p.s.i. As previously explained, the mastication of the hay breaks down the cell structure and destroys the resiliency of the hay so that the pellets will retain their shape during drying.

All moisture contents referred to herein have been expressed as percentages calculated on the wet basis. Such wet basis calculations are made by determining the ratio of the weight of water in the pellet to the total weight of the pellet.

From the foregoing description it is apparent that the method of the present invention is operable with hay having a moisture content within the range of 14% to 35% and that pellets of excellent consistency and of desirable density can be made with pressures as low as 200 p.s.i. and with correspondingly low energy input. The method includes a masticating step wherein the hay is crushed, ruptured and cut into a limp fibrous mass. This masticating step liberates the glutenous juices from the stems and the leaves of the hay and these juices act as a binder for the pellets. The masticating step also substantially eliminates the resilience of the hay fibers so that very low compressive forces are required to form the pellets and so that there is little increase in pellet size after the compressive forces have been released.

It should be understood that throughout the specification and claims wherever the term "fibers" is used, this term is intended to include single fibers, groups of fibers, and pieces of stem.

While one embodiment of the present invention has been shown and described, it will be understood that various changes and modifications may be made without departing from the spirit of the invention or the scope of the appended claims.

The invention having thus been described, what is believed to be new and desired to be protected by Letters Patent is:

1. A method of pelleting hay comprising the steps of crushing, tearing and rupturing the hay to break down the natural structure of the stems into fibers thereby reducing the natural resilience of the stems and liberating the glutenous juices from the stems so as to produce a damp mass of limp, fibrous material, confining and applying pressure to the material while in a damp, limp condition to compress the material into pellets containing interwoven fibers of hay, the interwoven fibers remaining in their limp, non-resilient state in the newly formed pellet, the liberated glutenous juices of the hay acting as binder, the interwoven fibers serving to provide a relatively strong pellet.

2. A method of pelleting hay comprising the steps of crushing, tearing and rupturing hay having a moisture content in the range of 14% to 35% to break down the natural structure of the stems into fibers thereby reducing the natural resilience of the stems and liberating the glutenous juices from the stems so as to produce a damp mass of limp, fibrous material, confining and applying pressure to the material while in a damp, limp condition to compress the material into pellets containing interwoven fibers of hay, the interwoven fibers remaining in their limp, non-resilient state in the newly formed pellet, the liberated glutenous juices of the hay acting as binder, the interwoven fibers serving to provide a relatively strong pellet.

3. A method of pelleting hay comprising the steps of crushing, tearing and rupturing hay having a moisture content in the range of 14% to 35% to break down the natural structure of the stems into fibers thereby reducing the natural resilience of the stems and liberating the glutenous juices from the stems so as to produce a damp mass of limp, fibrous material, confining and applying pressure in the range of 200 p.s.i. to 1600 p.s.i. to the material while in a damp, limp condition to compress the material into pellets containing interwoven fibers of hay, the interwoven fibers remaining in their limp, non-resilient state in the newly formed pellet, the liberated glutenous juices of the hay acting as binder, the interwoven fibers serving to provide a relatively strong pellet.

4. A method of pelleting hay comprising the steps of crushing, tearing and rupturing the hay to break down the natural structure of the stems into fibers having random lengths of about one-half inch or less with occasional longer lengths and thereby reducing the natural resilience of the stems and liberating the glutenous juices from the stems so as to produce a damp mass of limp, fibrous material, confining and applying pressure to the material while in a damp, limp condition to compress the material into pellets containing interwoven fibers of hay, the interwoven fibers remaining in their limp, non-resilient state in the newly formed pellet, the liberated glutenous juices of the hay acting as binder, the interwoven fibers serving to provide a relatively strong pellet.

5. A method of pelleting hay comprising the steps of crushing, tearing and rupturing the hay to break down the natural structure of the stems into fibers thereby reducing the natural resilience of the stems and liberating the glutenous juices from the stems so as to produce a damp mass of limp, fibrous material, confining and applying pressure to the material while in a damp, limp condition to compress the material into pellets containing interwoven fibers of hay, the interwoven fibers remaining in their limp, non-resilient state in the newly formed pellet, the liberated glutenous juices of the hay acting as binder, the pellet having little tendency to expand upon removal of the compression pressure, the interwoven fibers serving to provide a relatively strong pellet.

References Cited in the file of this patent

UNITED STATES PATENTS

| | | |
|---|---|---|
| 1,003,525 | Von Skorzewski | Sept. 19, 1911 |
| 2,223,904 | Zentz et al. | Dec. 3, 1940 |
| 2,386,052 | Lundy | Oct. 2, 1945 |
| 2,487,162 | Meyer et al. | Nov. 8, 1949 |

OTHER REFERENCES

"Compression in Dehydrated Vegetables," Food, January 1945, p. 18.

"The Handbook of Feedstuffs" by Seiden et al., Springer Pub. Co. Inc., New York, p. 229.